Nov. 10, 1970  W. A. MINIX  3,538,609
AIR GAUGE CARTRIDGE
Filed Dec. 29, 1969
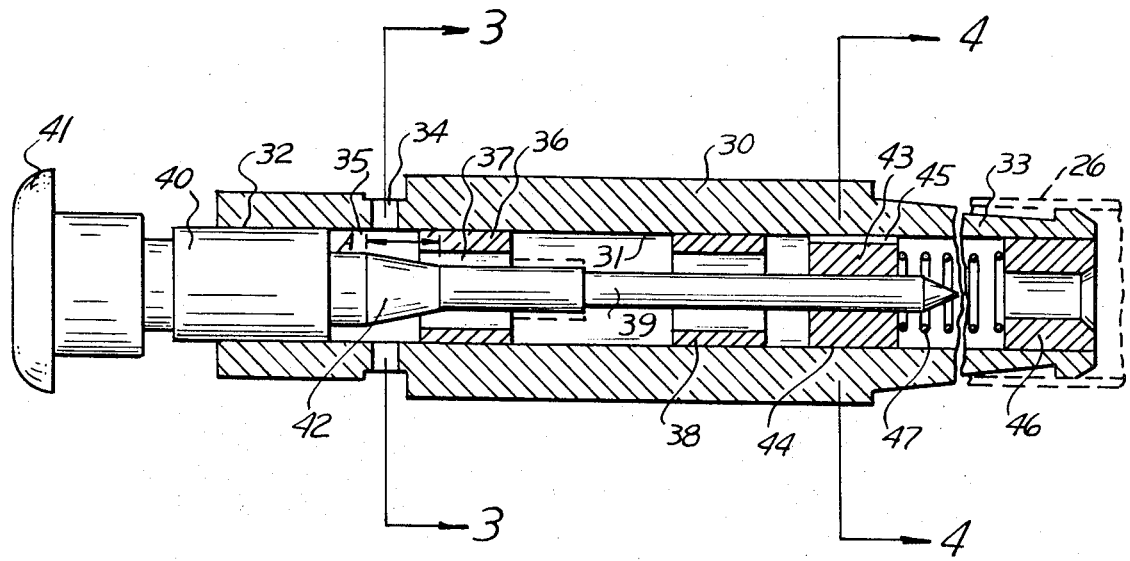
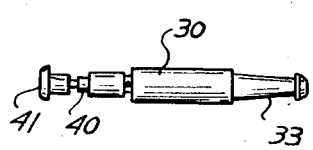
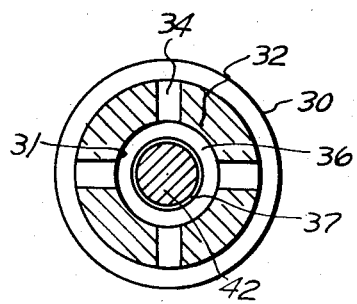
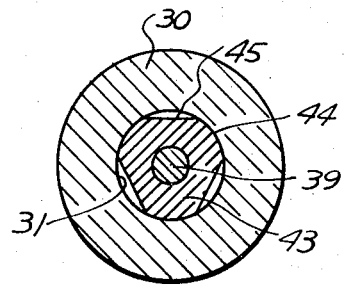
INVENTOR
WILLIAM A. MINIX
BY Cullen, Settle, Sloman & Cantor
ATTORNEYS

# United States Patent Office 3,538,609
Patented Nov. 10, 1970

3,538,609
AIR GAUGE CARTRIDGE
William A. Minix, Detroit, Mich., assignor to Freeland Gauge Company, Detroit, Mich.
Continuation-in-part of application Ser. No. 721,272, Apr. 15, 1968. This application Dec. 29, 1969, Ser. No. 888,530
Int. Cl. G01b 3/22
U.S. Cl. 33—172                                       1 Claim

ABSTRACT OF THE DISCLOSURE

An easy to assemble air gauge cartridge for controlling air bleeding in a pneumatic measuring circuit comprising: a uniform bored outer body with an inlet at one end and a guide bearing at its other end; a series of radial outlets in the outer body adjacent the end guide bearing; an orifice bushing and a stop bushing slidably fitted within the uniform bore and each, respectively, spaced inwardly of the radial outlets; a workpiece engaging stem axially mounted in the uniform bore by the end guide bearing and a fluted air and guide bearing at the opposite end of the stem; a spring, for outwardly biasing the stem, spaced between a retainer bearing slidably fitted in the inlet, and the fluted air and guide bearing; and an annular tapered air flow control valve on the stem movable into the aperture of the orifice bushing for variably regulating the rate of air flow.

---

This application, a continuation-in-part of my prior application, Ser. No. 721,272, filed Apr. 15, 1968, discloses a simple yet satisfactory air gauge cartridge, in the appended drawing, in which:

FIG. 1 is an elevational view of the cartridge, approximately life-size.

FIG. 2 is a greatly enlarged longitudinal sectional view.

FIGS. 3 and 4 are transverse sectional views on lines 3—3 and 4—4 of FIG. 2.

The cartridge hereof comprises a body 30 of about ¼ inch outside diameter and about 1½ inches in length having a uniform through bore 31 providing an internal guide bearing 32 at one end and an air inlet 33 at its other end. It has radial air outlets 34 near bearing 32.

Assembled into the body, in order, through its bearing end 32, are respectively a stop bushing 38, adjustably fixed in bore 31; an orifice or metering bushing 36 fixed within bore 31; and a workpiece engaging stem 39 extending loosely through bushings 36 and 38 and having a cylindrical bearing portion 40 and a workpiece engaging end 41 and also having a tapered valving portion 42 for metering coaction with bore 37 of metering bushing 36.

Assembled into the body, in order, through its air inlet end 33, are respectively an air bearing 43 secured to stem 39 and having guide areas 44 and air passage areas 45; a coil spring 47; and an anchor bushing 46 secured to body 30. Spring 47 reacts on bearing 43 and bushing 46. An air hose 26 may be coupled to air inlet end 33.

Bearing 43 is secured to stem 39 and guides stem 39 directly to body 30, and coacts with stop bushing 38 for limiting outward travel of stem 39. At no time can bearing 43 engage metering bushing 36.

When bearing 43 engages and is stopped by bushing 38, its air passages 45 are sealed by bushing 38, cutting off air flow to outlets 34.

Since metering bushing 36 cannot be engaged by bearing 43 nor by spring 47, and since the bore 37 of the metering bushing 36 is not engaged for stem guiding by guide bearing 43, metering bushing 36 is free of shocks and vibrations from bearing 43 and spring 47.

Removal of the stem 39 from the body, as for refacing its end 41 or for any other purpose, is simple; merely pull stem 39 outwardly, towards the left in the drawing. Guide bearing 43 will be stopped by bushing 38 and will strip off stem 39.

Now having described the cartridge hereof, reference should be had to the claim which follows.

What is claimed is:

1. An air gauge cartridge of about ¼ inch diameter and of about 1½ inches in length comprising:

an elongated body having a uniform bore therethrough and providing an internal guide bearing at one end and an air inlet at its other end; radial air outlets through said body inwardly of its bearing end;

a centrally bored metering or orifice bushing fixed within said bore axially inwardly of said air outlets;

a centrally bored stop bushing adjustably fixed within said bore remote from and axially inwardly of said orifice bushing;

a workpiece engaging stem axially mounted within the body extending loosely through said bushings; one end of said stem including a cylindrical portion slidably guided in said bore guide bearing on and projected outwardly of said bore at said bearing end for engagement with a workpiece;

a longitudinally fluted air and guide bearing fixed upon the other end of said stem with peripherally spaced portions guidably and slidably bearing against said bore and normally spaced from said stop bushing, but engageable therewith in the adjusted fixed position of said stop bushing, to limit outward travel of said stem;

with said stop bushing being between the orifice bushing and the air bearing so that the latter at no time can engage the orifice bushing, being blocked from engagement with said orifice bushing by said stop bushing which is between the orifice bushing and the air bearing;

a spring anchor bushing in said body at its air inlet end;

a coil spring anchored at one end within said air inlet end of said body by said anchor bushing, and at its other end axially bearing against said air bearing for biasing said stem outward of said bore, said spring at no time reacting against said orifice bushing, being blocked from engagement with said orifice bushing by said air bearing and said stop bushing;

and an annular tapered air flow control valve element on said stem movable into the bore of said orifice bushing for variably regulating the rate of air flow through said orifice bushing;

the parts being so arranged that they may be assembled in the body as follows:

the stop bushing is thrust into the body through its bearing end;

then the orifice bushing is thrust into the body through its bearing end;

then the stem is thrust into the body through its bearing end and through the bushings;

then the air bearing is thrust into the body through its air inlet end and thrust onto and fixed onto said stem;

then the spring is thrust into the body through its air inlet end;

then the anchor bushing is thrust into the body through its air inlet end;

with the assembled parts also being so arranged that the stem may be removed from the body by being pulled out through the body bearing end, with the air bearing then being stripped off the stem by contact with the stop bushing;

the parts also being such that engagement of the air bearing with the stop bushing for stopping of outward travel of the stem also causes the stop bushing to seal off air flow through the cartridge by sealing off the air passage areas between the peripherally spaced guide portions of the air bearing.

References Cited
UNITED STATES PATENTS

| | | | |
|---|---|---|---|
| 2,995,825 | 8/1961 | Sakaitis | 33—172 |
| 3,147,615 | 9/1964 | Minix | 73—37.5 |

LEONARD FORMAN, Primary Examiner

D. A. DEARING, Assistant Examiner